US009249369B2

(12) United States Patent
Wey

(10) Patent No.: US 9,249,369 B2
(45) Date of Patent: Feb. 2, 2016

(54) INFRARED AIDED FUEL EMULSION

(76) Inventor: Albert Chin-Tang Wey, Westmont, IL (US)

(*) Notice: Subject to any disclaimer, the term of this patent is extended or adjusted under 35 U.S.C. 154(b) by 485 days.

(21) Appl. No.: 13/065,908

(22) Filed: Apr. 1, 2011

(65) Prior Publication Data

US 2012/0247000 A1 Oct. 4, 2012

(51) Int. Cl.

| | |
|---|---|
| ***C10L 1/32*** | (2006.01) |
| ***B01J 19/08*** | (2006.01) |
| ***C10L 3/00*** | (2006.01) |
| ***C10L 3/06*** | (2006.01) |
| ***B01F 13/00*** | (2006.01) |
| ***B01F 3/08*** | (2006.01) |

(52) U.S. Cl.

CPC ................ *C10L 3/00* (2013.01); *B01F 3/0815* (2013.01); *B01F 13/001* (2013.01); *C10L 1/32* (2013.01); *C10L 3/06* (2013.01)

(58) Field of Classification Search

USPC .............................. 123/538; 422/186; 44/301

See application file for complete search history.

(56) References Cited

U.S. PATENT DOCUMENTS

| | | | |
|---|---|---|---|
| 4,388,893 A | 6/1983 | Apfel | |
| 5,997,590 A | 12/1999 | Johnson et al. | |
| 6,026,788 A | 2/2000 | Wey | |
| 6,082,339 A * | 7/2000 | Wey | 123/538 |
| 6,800,154 B1 | 10/2004 | Carey et al. | |
| 7,041,145 B2 | 5/2006 | Ambrosini et al. | |
| 7,617,815 B2 | 11/2009 | Wey | |
| 7,704,288 B2 | 4/2010 | Rivas et al. | |
| 2012/0297665 A1 * | 11/2012 | Goerz, Jr. | 44/301 |

* cited by examiner

*Primary Examiner* — Prem C Singh
*Assistant Examiner* — Chantel Graham
(74) *Attorney, Agent, or Firm* — IpHorgan Ltd.

(57) ABSTRACT

This invention relates to a system and a method for generating emulsified fuels for improved fuel efficiency of combustion devices with reduced specific fuel consumption rate and emissions, comprising at least a continuous phase fuel, a dispersed phase component, and an infrared radiation source whose infrared radiation spans at least a portion of 3-16 micrometers wavelength spectrum. In said system the continuous phase fuel and/or dispersed phase component are exposed to said infrared before or during emulsification. The continuous phase fuel may be selected from fossil fuels, biofuels, alcohol fuels, vegetable oils, or any combustible liquid fuels, while the dispersed phase component may be oxygen, hydrogen, nitrogen, carbon monoxide, methane, propane, butane, any petroleum gas, hydrogen peroxide, or water. The emulsified fuels can be used in combustion devices such as internal combustion engines, boilers, burners, or gas turbines.

15 Claims, 1 Drawing Sheet

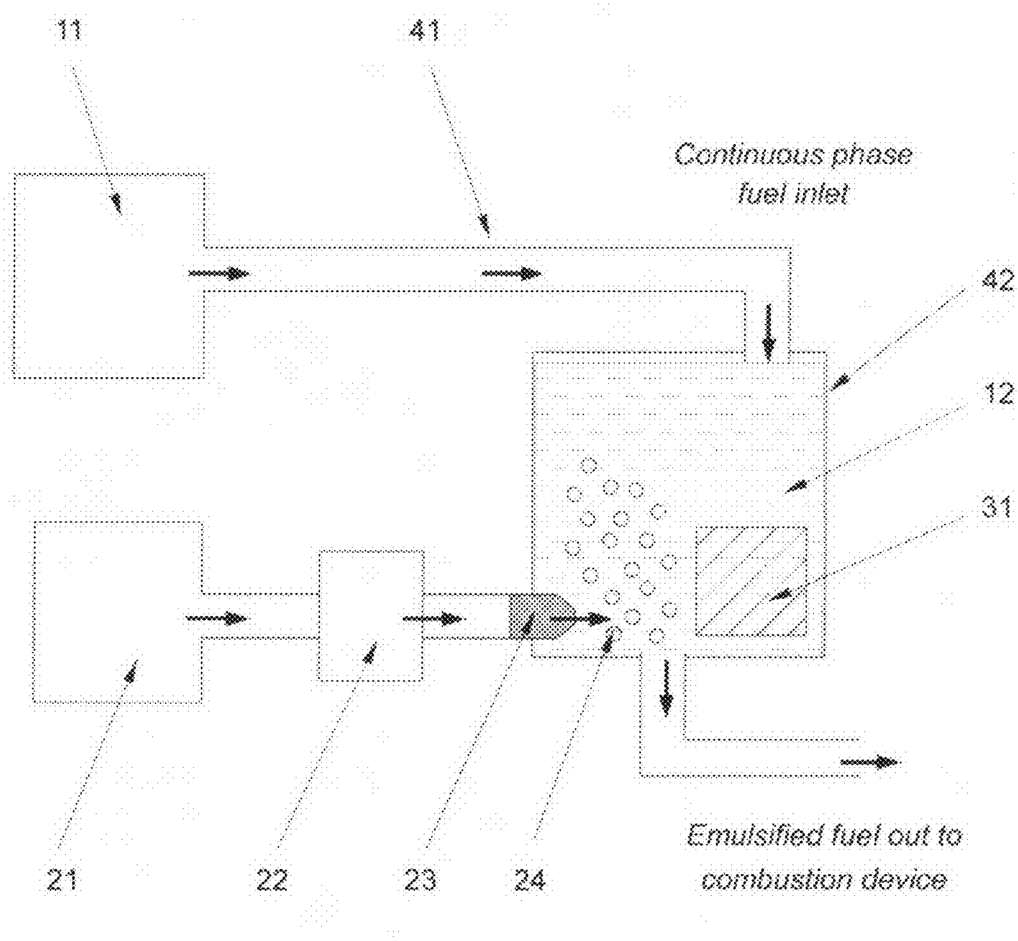
11
41
Continuous phase
fuel inlet
42
12
31
21
22
23
24
Emulsified fuel out to
combustion device

INFRARED AIDED FUEL EMULSION

BACKGROUND

1. Field of Invention

This invention relates to a system and a method for generating emulsified fuels for improved fuel efficiency in a combustion device to enhance its performance with reduced specific fuel consumption rate and emissions, comprising at least a continuous phase fuel, a dispersed phase component, and an infrared radiation source that spans at least a portion of 3-16 μm (micrometers) wavelength spectrum. In said system and method the continuous phase fuel and/or dispersed phase component are exposed to said infrared before or during emulsification process. The continuous phase fuel may be selected from fossil fuels, biofuels, alcohol fuels, vegetable oils, or any combustible liquid fuels, while the dispersed phase component may be oxygen, hydrogen, nitrogen, carbon monoxide, methane, propane, butane, any other petroleum gas, hydrogen peroxide, or water. Such emulsified fuels can be used in combustion devices such as internal combustion engines, boilers, burners, or gas turbines.

2. Description of Prior Art

The Clean Air Act of 1963, and later amendments, mandates the reduction of airborne contaminants, smog and air pollution in general from both stationary and mobile sources. Numerous techniques were attempted to address these requirements, including the use of emulsified fuels with a hope to improve combustion efficiency of hydrocarbon fuel blends. For examples, water-in-hydrocarbon emulsions have been extensively studied and shown some success in reducing targeted emissions from diesel engines, but unfortunately not without facing serious technical problems due to the stability of emulsions and the pollutants produced by the burning of emulsifying agent. Inventions in this field may be found in U.S. Pat. Nos. 4,388,893, 5,997,590, 6,800,154, 7,041,145, and 7,704,288, to name a few. In spite of the theoretical potential of emulsified systems, aforementioned problems casted a shadow over the feasibility of commercial applications of such techniques.

In theory, emulsions are made up of a dispersed and a continuous phase. The dispersed phase exhibits a surface and is covered by a different surface of continuous phase; the boundary between these phases is called the interface. It is a common belief that the dispersed particles are assumed to be statistically distributed in the continuous phase. As such, energy input through homogenizing process is needed to initially form an emulsion. This energy can be applied through shaking, stirring, vibrating, or by the use of high-speed propelling, ultrasonic, or high pressure means. Nonetheless, emulsions are unstable and, over time, tend to revert to the stable state of the phases comprising the emulsion.

In practical applications, the difficulty in making a useful emulsion of hydrocarbon fuel is on its high interfacial tension with the dispersed phase. Furthermore, increasing temperature of the fuel, through fuel delivery system of a combustion device, may accelerate destabilization. Surface active substances (called surfactants, emulsifier, emulsifying agent, or emulgent) can increase the kinetic stability of emulsions greatly so that they may be added to the mixture for making and maintaining the emulsion. However, these additives are expensive and may add unwanted pollutants to the emissions during combustion, which would be better off to avoid, if possible.

Accordingly, one main challenge remains in the industry is to develop a stable and sustainable emulsion system without the need for relatively large amount of stabilizing agents. It is one of the objects of the present invention to address and meet this need.

After years of research the present inventor had discovered the use of infrared radiation in the 3-16 μm wavelength spectrum, defined as "mid-infrared" by U.S. NASA but "far infrared" in Japanese convention, for enhancing combustion efficiency of hydrocarbon fuels in internal combustion engines. It resulted in the inventions of the fuel combustion enhancement devices disclosed in the U.S. Pat. Nos. 6,026,788, 6,082,339 and 7,617,815.

Photoexciting hydrocarbons with infrared photons shorter than 20 μm (micrometers) in wavelengths has been described theoretically and experimentally in Organic Chemistry textbook. When a photon is absorbed by a molecule, it ceases to exist and its energy is transferred to the molecule in one of vibrational, rotational, electronic, and translational forms. Numerous organic compounds, such as hydrocarbons, are known to be infrared-active and absorb infrared photons in 3-16 μm wavelengths to cause molecular vibrations in stretching and/or bending movement. Thus, exciting hydrocarbons with infrared in said wavelengths can increase the internal energy of hydrocarbon molecules and improve reaction rate for better fuel efficiency in engines. The present inventor has proven the underlining science of infrared-excitation effect on hydrocarbon fuels and the results were published by the SAE International (Paper No. 2010-01-1953) entitled "Infrared-excitation for Improved Hydrocarbon Fuels' Combustion Efficiency-Concept and Demonstration."

Moreover, the present inventor was also trying to explore new IR-related technologies that further improve fuel efficiency in different research fronts. Among them, one is fuel emulsion, purposely adding various gaseous or liquid components to fossil or alternative fuels for a more efficient fuel admixture. Although by definition an emulsion is a mixture of two or more immiscible liquids, the term emulsion is extended to dispersing gaseous component in liquid fuel throughout this invention.

In preliminary lab experiments with diesel fuels and vegetable oils, the present inventor found that after exciting the fuels or oils with infrared emitted from the ceramics as described in aforementioned U.S. patents by the present inventor, they become relatively susceptible to dispersion of gaseous or liquid components, such as water, air, or hydrogen. This is believed that the molecules in the continuous phase fuel or oil are excited by absorbing infrared in 3-16 μm. The excited molecules tend to break away from forming large clusters or aggregates, resulting in reduced interfacial tension with the dispersed phase and helping homogenizing the mixture. Though such infrared assisted emulsion is short haul, only lasting for about 3-5 minutes before the majority of infrared photons have escaped from the system, it is suitable for "emulsion-on-demand" applications, in which it only takes a few seconds for the emulsified fuel from being made to being burned in a combustion device.

As described above, the prior art failed to teach the use of IR-excitation in the making of fuel emulsions to improve fuel efficiency of the emulsified fuel in a combustion device for increased performance with reduced specific fuel consumption rate and emissions.

OBJECTS AND ADVANTAGES

Accordingly, one object of this invention is to provide a system and method for generating emulsified fuels to be used in combustion devices for improved performance with reduced specific fuel consumption rate and emissions;

Another object of the present invention is to provide a simple, cost-effective fuel emulsion system and method that will work on nearly all combustion devices, no change in specifications required.

Also, one object of the present invention is to provide a simple, cost-effective fuel emulsion system that will work on all fossil fuels or alternative fuels with no or minimal amount of stabilizing agents.

These objectives are achieved by a system and method of the present invention comprising at least a dispersed phase component, a continuous phase fuel, and an infrared radiation source, which spans at least a portion of 3-16 μm wavelength spectrum, so that said dispersed phase component and continuous phase fuel will be exposed to and excited by said infrared prior to or during emulsification process.

Other objects, features, and advantages of the present invention will hereinafter become apparent to those skilled in the art from the following description.

DRAWING FIGURES

FIG. 1 is a schematic illustration showing one embodiment of the present invention with the infrared radiation source being disposed in a mixing chamber, in which dispersed phase component is injected into continuous phase fuel for the making of emulsion before the emulsified fuel enters a combustion device for combustion.

| Reference Numerals in Drawings | |
|---|---|
| 11 Continuous Phase fuel supply means | 12 Continuous Phase fuel |
| 21 Disperse Phase component supply means | 22 Pumping means |
| 23 Injection means | 24 Disperse Phase component |
| 31 Infrared radiation source | 41 Fuel delivery means |
| 42 Mixing chamber | |

SUMMARY

In accordance with the present invention a system and method for generating emulsified fuel to enhance fuel efficiency of a combustion device, comprising at least a continuous phase fuel, a dispersed phase component, and an infrared radiation source that spans at least a portion of 3-16 μm wavelength spectrum, in which the continuous phase fuel and/or dispersed phase component is exposed to said infrared before or during emulsification. The continuous phase fuel may be selected from fossil fuels, biofuels, alcohol fuels, vegetable oils, or any combustible liquid fuels, while the dispersed phase component may be oxygen, hydrogen, nitrogen, carbon monoxide, methane, propane, butane, any petroleum gas, hydrogen peroxide, or water. Such emulsified fuels may be used in combustion devices including internal combustion engines, boilers, burners, or gas turbines.

DETAILED DESCRIPTION OF THE INVENTION

FIG. 1 shows one embodiment of the present invention with the infrared radiation source 31 being disposed in the continuous phase fuel 12 in a mixing chamber 42. The continuous phase fuel 12 is provided from a supply means 11 through a delivery means 41. The fuel supply means 11 may be a tank, equipped with a fuel pump, and the delivery means 41 a fuel line. The continuous phase fuel may be selected from fossil fuels, biofuels, alcohol fuels, vegetable oils, or any combustible liquid fuels.

The dispersed phase component supply means 21 may be, but not limited to, a storing means such as cylinder or tank that stores and supplies said dispersed phase component, which may be natural gas, oxygen, hydrogen, nitrogen, carbon monoxide, methane, propane, butane, any petroleum gas, hydrogen peroxide, or water. The dispersed phase component supply means 21 may further be a complicated production-on-demand device, such as water-electrolysis for hydrogen generation in the applications that hydrogen is used as dispersed phase component. A pump 22 and an high pressure injector 23 may be needed to provide homogenizing energy for emulsification so that the dispersed phase component 24 can be injected into continuous phase fuel 12, under the influence of infrared radiation source 31, before the emulsified fuel enters combustion device for combustion. The combustion device, not shown in FIG. 1, may be internal combustion engine, boiler, burner, or gas turbine.

The infrared radiation source 31 may consist of at least one IR-emitting ceramic composite whose infrared radiation spans at least a portion of 3-16 μm wavelength spectrum. This IR-emitting ceramic composite may be, but not limited to, one of the devices described in U.S. Pat. Nos. 6,026,788, 6,082,339 & 7,617,815 by the present inventor. The IR radiation source 31 of the present invention may take any shapes, forms, styles, patterns, and in any dimensions allowed by practical deployments. The IR radiation source 31 can be disposed on anywhere along the fuel system of the combustion device, including fuel tanks, lines, pumps, filters, injectors, or any add on retrofits, and the like. The IR radiation source 31 can be arranged in any way, either in direct contact with continuous phase fuel 12 or at proximity of the continuous phase fuel 12 without direct contact, provided that infrared will penetrate the media. The infrared at said wavelengths can penetrate any nonmetal materials.

When retrofitted to the fuel system of a combustion device, the infrared-emitting ceramic of the IR radiation source 31 can absorb radiation heat from ambience to emit IR photons in said wavelengths. The molecules in the continuous phase fuel 12 can absorb a number of IR photons at assorted wavelengths, in said wavelength spectrum, that match its fundamental and combination vibrational modes to cause molecular vibrations, known as the molecular multiphoton process (MMP). The constituent electrons can climb up the ladder of vibrational states and reach excited states. As a result, IR-excited fuel molecules become vibrant, reducing the probability of forming large aggregates that allows better distribution of the dispersed phase component 24 in the continuous phase fuel 12. This provides a theoretical ground for the present invention.

Although only one exemplary embodiment of the present invention is presented herein for illustrating the concept, there are numerous ways of deployment may be chosen depending on the applications.

CONCLUSION, RAMIFICATIONS, AND SCOPE

According to the present invention a system and method for generating emulsified fuels to achieve a better efficiency in combustion devices comprises at least a continuous phase fuel, a dispersed phase component, and an infrared radiation source whose infrared spans at least a portion of 3-16 μm wavelength spectrum.

The invention has been described above. Obviously, numerous modifications and variations of the present invention are possible in light of the above teachings. Such variations are not to be regarded as a departure from the spirit and scope of the invention and all such modifications as would be obvious to one skilled in the art are intended to be included within the scope of the following claims.

I claim:

1. A method for generating emulsified fuels for combustion devices, comprising:
- delivering a continuous phase fuel to a mixing chamber;
- delivering a dispersed phase component to an injection system;
- exposing the continuous phase fuel and/or the dispersed phase component to emissions from an infrared radiation source, said source emitting infrared that spans at least a portion of 3-16 micrometers wavelength spectrum;
- injecting the dispersed phase component into the mixing chamber containing the delivered continuous phase fuel during or after exposing the continuous phase fuel and/or the dispersed phase component to the infrared emissions, wherein the continuous phase fuel and the dispersed phase component form an infrared-exposed mixture;
- conveying the infrared-exposed mixture to a fuel delivery system of a combustion device prior to destabilization of the infrared-exposed mixture; and
- combusting the infrared-exposed mixture in the combustion device prior to destabilization of the infrared-exposed mixture.

2. A method according to claim 1, wherein the continuous phase fuel is fossil fuel, biofuel, alcohol fuel, or vegetable oil.

3. A method according to claim 1, wherein the dispersed phase component is natural gas, oxygen, hydrogen, nitrogen, or carbon monoxide.

4. A method according to claim 1, wherein the dispersed phase component is a petroleum gas.

5. A method according to claim 4, wherein the petroleum gas is methane, propane, or butane.

6. A method according to claim 1, wherein the dispersed phase component is selected from hydrogen peroxide or water.

7. A method according to claim 1, wherein the infrared radiation source comprises at least one ceramic composite.

8. A method according to claim 7, wherein the ceramic composite comprises a mixture of metal oxides having a specific spectral luminance in at least a portion of the 3-16 micrometers wavelength spectrum.

9. A method according to claim 8, wherein the ceramic composite comprises a pyroelectric material.

10. A method according to claim 9, wherein the proelectric material is tourmaline.

11. A method according to claim 1, wherein the infrared radiation source is in direct contact with the continuous phase fuel and/or dispersed phase component.

12. A method according to claim 1, wherein the infrared radiation source is placed inside a component of a fuel-delivery system of a combustion device.

13. A method according to claim 1, wherein the combustion device is an internal combustion engine, boiler, burner, or gas turbine.

14. A method according to claim 1, wherein the combusting step occurs less than 5 minutes after the injecting step.

15. A method according to claim 1, wherein the combusting step occurs less than 3 minutes after the injecting step.

* * * * *